US012578915B2

(12) United States Patent
Nakagawa

(10) Patent No.: US 12,578,915 B2
(45) Date of Patent: Mar. 17, 2026

(54) INFORMATION PROCESSING DEVICE, INFORMATION PROCESSING METHOD, AND PROGRAM

(71) Applicant: Faurecia Clarion Electronics Co., Ltd., Saitama (JP)

(72) Inventor: Yuichiro Nakagawa, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 18/769,804

(22) Filed: Jul. 11, 2024

(65) Prior Publication Data

US 2025/0021292 A1     Jan. 16, 2025

(30) Foreign Application Priority Data

Jul. 13, 2023     (JP) ................................. 2023-115415

(51) Int. Cl.
*G06F 3/14*          (2006.01)
(52) U.S. Cl.
CPC .................................. *G06F 3/1454* (2013.01)
(58) Field of Classification Search
CPC .... G06F 3/1454; G06F 3/1423; G06F 3/1446; G06F 3/147; G06F 3/14; G09G 5/12; G09G 2370/022; G09G 2370/16; H04N 21/43076; H04N 21/4307; H04N 7/15; H04N 7/152; H04L 65/4015; H04L 65/403; H04L 65/4038; H04L 65/4046; B60K 35/81;

(Continued)

(56) References Cited

U.S. PATENT DOCUMENTS

| | | |
|---|---|---|
| 2018/0069761 A1 | 3/2018 | Iwami et al. |
| 2021/0204102 A1 | 7/2021 | Han et al. |
| 2024/0231734 A1* | 7/2024 | Joukan ..................... G09G 5/00 |

FOREIGN PATENT DOCUMENTS

| | | |
|---|---|---|
| EP | 3282810 A1 | 2/2018 |
| JP | 2019-511798 A | 4/2019 |

(Continued)

OTHER PUBLICATIONS

German Office Action issued on Jun. 23, 2025 for German Patent Application No. 102024118703.4.

(Continued)

*Primary Examiner* — Koosha Sharifi-Tafreshi
(74) *Attorney, Agent, or Firm* — Volpe Koenig

(57)     ABSTRACT

An information processing device maintains the convenience of other devices even when requested by one screen-sharing destination device. A screen generation unit generates the screen to be displayed on a first display. The transmission/reception control unit transmits the screen to the external terminals. The operation detection unit detects a user operation performed on a screen displayed on a second display unit provided by the external terminals. The display control unit controls the display of a selection screen to a device selected from the information processing device and the external terminals in order to allow the user to select whether or not to allow execution of an event based on the operation in response to the screen and operation. The event execution determination unit determines whether to permit execution of an event based on an operation in response to the result of selection by a user on the selection screen.

7 Claims, 11 Drawing Sheets

(58) Field of Classification Search
CPC ........ B60K 2360/577; B60K 2360/569; B60K
2360/56; B60K 2360/563; B60K
2360/566; B60K 2360/573; B60K
2360/55; B60K 2360/182; B60K
2360/184; B60K 2360/195; B60K
2360/197; B60K 2360/111; B60K 35/22;
G08C 2201/93
See application file for complete search history.

(56)     References Cited

FOREIGN PATENT DOCUMENTS

| | | | |
|---|---|---|---|
| WO | 2016163181 | A1 | 10/2016 |
| WO | 2017142336 | A1 | 8/2017 |

OTHER PUBLICATIONS

PHILANDRO Software GmbH: AnyDesk—User Manual: For Windows, macOS, Linux, iOS and Android. Version 4.0.1. Published Apr. 2018. Stuttgart, 2018. v,88—Company font. https://reci.ch/download/AnyDesk-Benutzerhandbuch.pdf [accessed on Jun. 20, 2025].

\* cited by examiner

Figure 6:
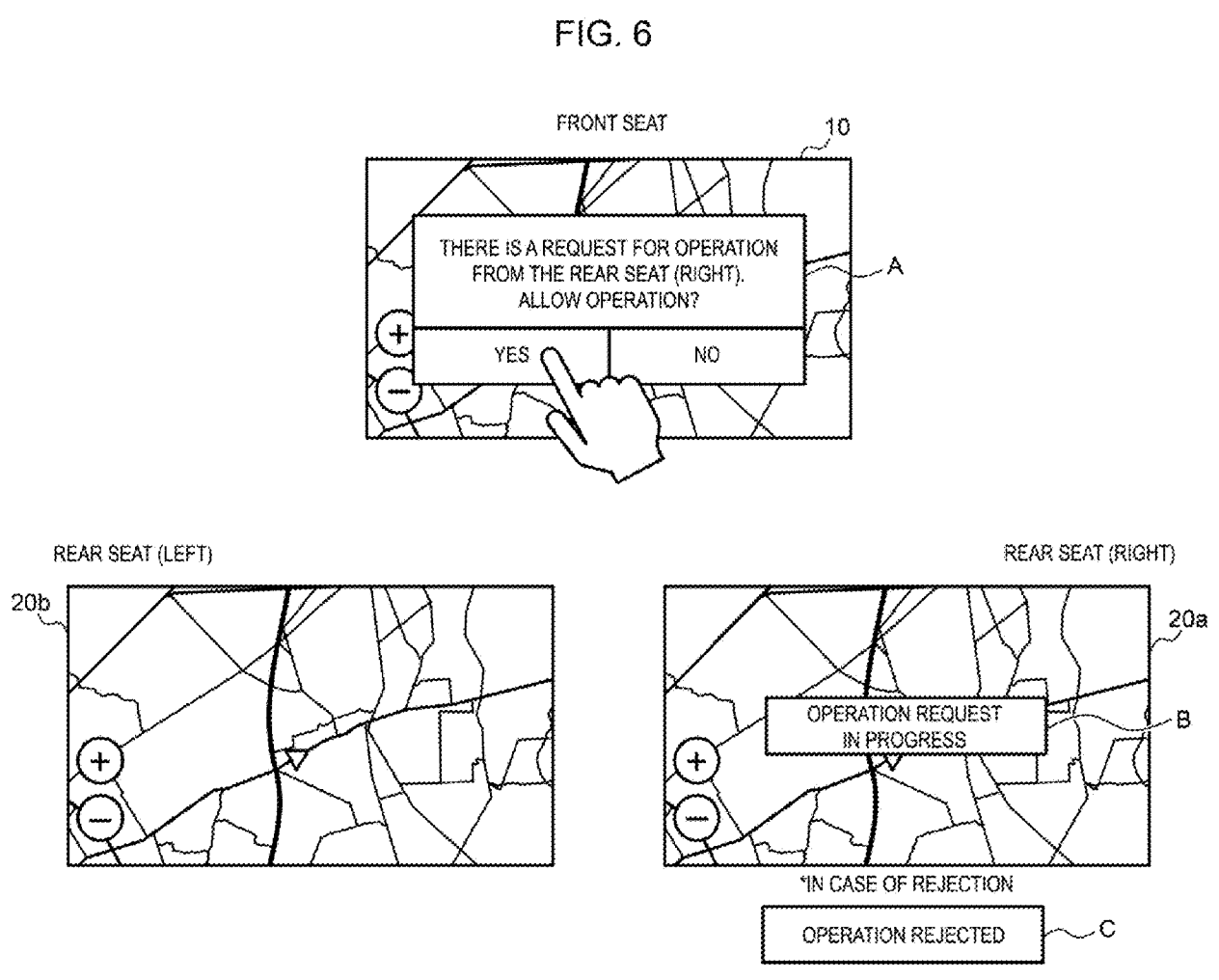

FRONT SEAT

10

THERE IS A REQUEST FOR OPERATION
FROM THE REAR SEAT (RIGHT).
ALLOW OPERATION?

YES    NO

A

REAR SEAT (RIGHT)

20a

OPERATION REQUEST
IN PROGRESS

B

*IN CASE OF REJECTION

OPERATION REJECTED

C

REAR SEAT (LEFT)

20b

FRONT SEAT

REAR SEAT (RIGHT)

WOULD YOU LIKE TO OPEN THIS PAGE IN YOUR BROWSER?

YES    NO

REAR SEAT (LEFT)

FIG. 11

| ID | PROCESSING REQUEST NOTIFICATION CONTENT |
|---|---|
| 1 | "OPERATION REQUEST PERMITTED (YES OR NO)" IS DISPLAYED |
| 2 | DISPLAY "REQUEST IN PROGRESS" |
| 3 | DISPLAY "OPERATION REQUEST REJECTED" |
| 4 | "OPERATION REQUIRED? (YES OR NO)" IS DISPLAYED |
| 5 | INFORMATION INDICATING THAT THE BRWOSER IS ACTIVATED |
| 6 | ... |
| ... | ... |

INFORMATION PROCESSING DEVICE, INFORMATION PROCESSING METHOD, AND PROGRAM

FIELD OF THE INVENTION

The present invention relates to an information processing device, information processing method, and a program.

BACKGROUND ART

In a mirroring system that performs screen sharing between a plurality of devices, the screen of the screen-sharing source device (for example, in-vehicle device) may be uniformly controlled based on a request from a single screen-sharing destination device (for example, a smart-phone).

Document 1 discloses an information processing device provided with a wireless communication unit and a control unit. This wireless communication unit performs data communication with other information processing devices. In addition, a case of a new data transmission to and from a first information processing device that performs a role of group owner of a network formed by at least this device and the first information processing device is assumed. In this case, the control unit controls the exchange of information to update the role for data transmission to each of the first information processing device and the second information processing device.

Document 2 discloses a 5G or pre-5G communication system provided to support higher data transmission rates after 4G communication systems such as LTE. This is a method of using a service in which a plurality of electronic devices are linked to a first electronic device, and includes a step of connecting to a central display device, and having the first electronic device mirror the service to the central display device based on a playlist of stored services. It also includes a step of receiving a playback list change request from a second electronic device and updating the playback list in response to the change request. It also includes a step of transmitting the updated playlist related information to a central display device.

PRIOR ART DOCUMENTS

Document 1: WO2016/163181 A1 (Equivalent to US20180069761 A1 and EP3282810 A1)
Document 2: WO2017/142336 A1

SUMMARY OF THE INVENTION

Problem to be Solved by the Invention

However, based on the request, the display screen is controlled by one screen sharing destination, which is not convenient for devices other than this one screen sharing destination.

An object of the invention is to provide an information processing device, information processing method, and program that can maintain convenience for other devices even when a request is made by one screen sharing destination device.

Means for Solving the Problem

In order to solve the above problem, the information processing device of the present invention has the following configuration.

The screen generation unit generates a screen to be displayed on the first display unit. The transmission/reception control unit transmits the screen to the external terminals via a network. The operation detection unit detects a user operation performed on a screen displayed on the second display unit provided by the external terminals. The display control unit controls the display of a selection screen to at least one device selected from the information processing device and the external terminals in order to allow the user to select whether or not to allow execution of an event based on the operation in response to the screen and operation. The event execution determination unit determines whether or not to permit execution of an event based on an operation in response to the result of selection by a user on the selection screen.

Effect of the Invention

The invention can provide an information processing device, information processing method, and program that can maintain convenience for other devices even when a request is made by one screen sharing destination device.

BRIEF DESCRIPTION OF THE DRAWINGS

FIG. 1 is a block diagram depicting a configuration of a display control system applicable to the present invention.

FIG. 6 depicts a screen displayed on each device when a user of an external terminal performs a map screen zoom-out operation.

FIG. 11 depicts notification information.

EMBODIMENTS OF THE INVENTION

Figure 2:
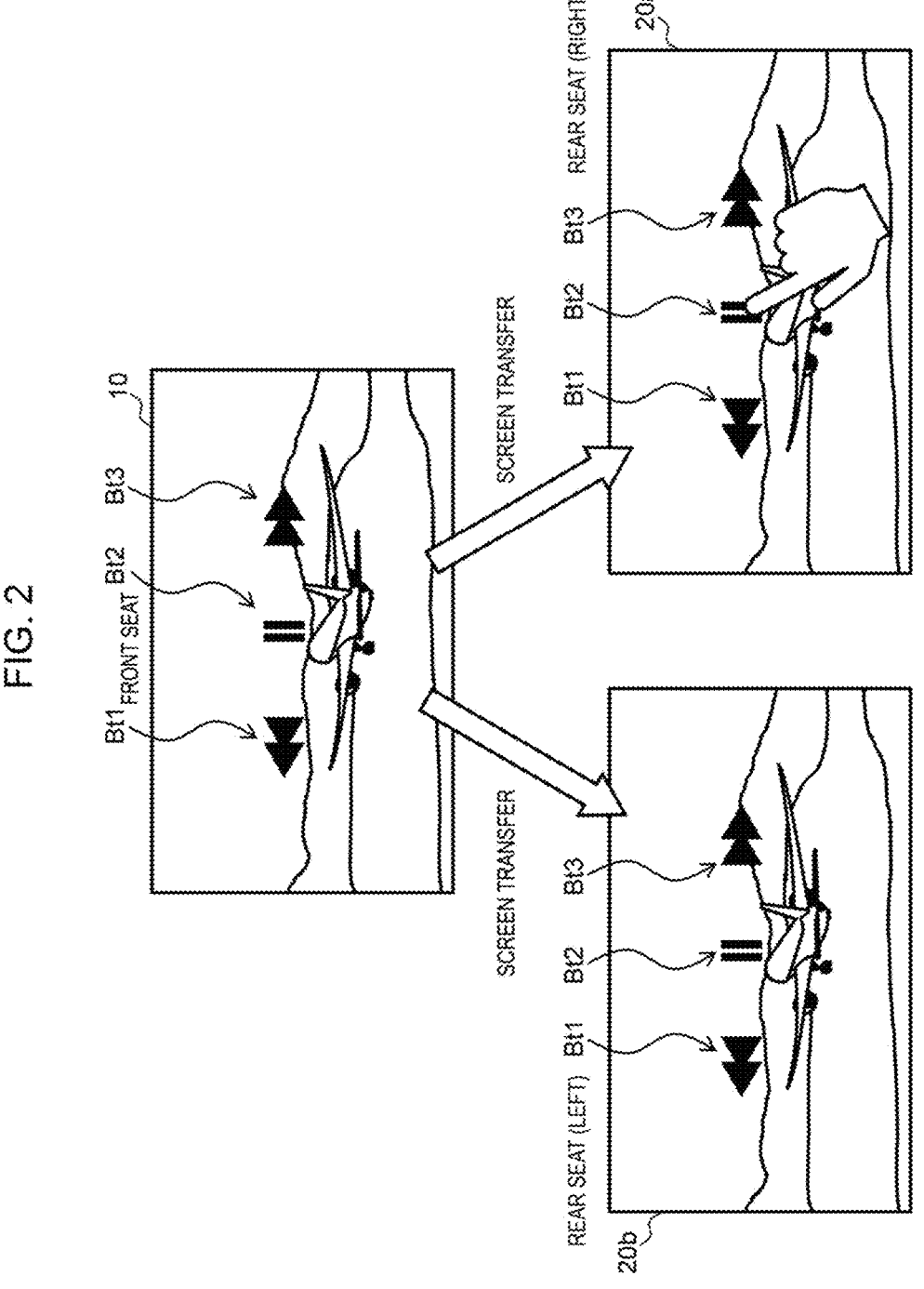
FIG. 2 depicts a multimedia playback screen being displayed on the information processing device and the external terminal.

Embodiments of the present invention are described below with reference to the accompanying diagrams.

Schematic Description of the Image Control System 1

Figure 1:
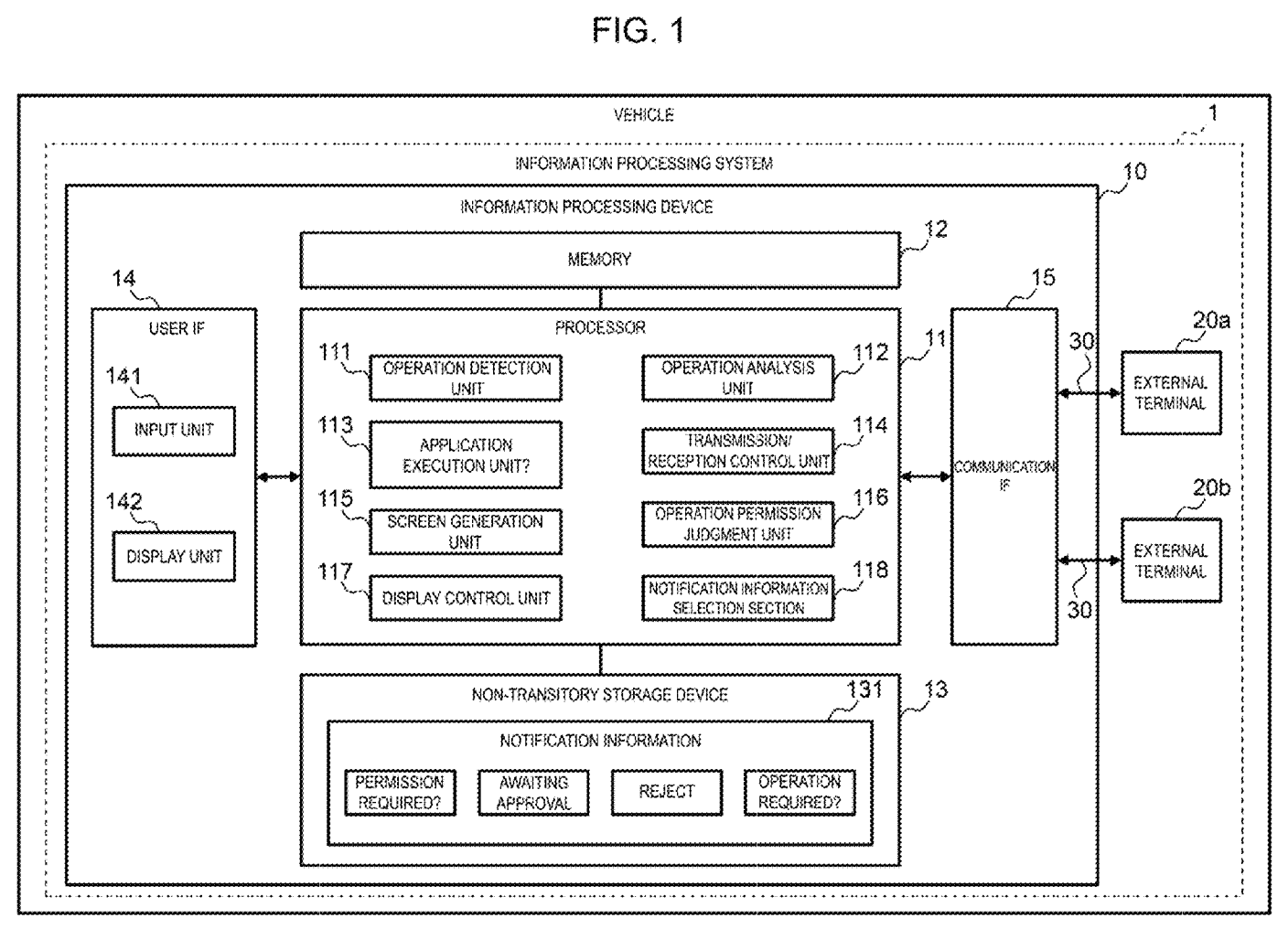

FIG. 1 is a block diagram depicting a configuration of a display control system 1 applicable to the present invention.

The image control system 1 is mounted on a vehicle, which is an example of a moving body. The image control system 1 is equipped with an information processing unit 10 and external terminals 20*a* and 20*b*. The information processing unit 10 and the external terminals 20*a* and 20*b* are connected by a network 30.

The information processing unit 10 generates image information for a screen to be shared with the external terminals 20A and 20B, and also displays this screen.

The information processing unit 10 is a computer device. More specifically, the information processing unit 10 is a car navigation device, car audio device, car control system, or the like. As depicted in the figure, the information processing unit 10 is equipped with a processor 11 such as a Central Processing Unit (CPU), a memory 12 as storage means, and a permanent storage device 13 such as a Hard Disk Drive (HDD) or Solid-State Drive (SSD). The processor 11 executes various software such as operating systems (basic software) and application programs (application software), and the like. The memory 12 is a memory area for storing various software and data used to execute the software, or the like. Permanent memory 13 is a memory area for storing input data for various software and output data from various software.

Furthermore, the information processing device 10 is also equipped with a user interface (hereinafter referred to as "user IF") 14 for exchanging information with the user and a communication interface (hereinafter referred to as "communication IF") 15 for communicating with the outside.

The processor 11 performs processing to achieve the functions of the operation detection unit 111, event analysis unit 112, application execution unit 113, transmission/reception control unit 114, screen generation unit 115, event execution determination unit 116, display control unit 117, and notification information selection unit 118.

The operation detection unit 111 detects a user operation performed on a screen displayed on the external terminals 20*a* and 20*b*.

The event analysis unit 112 analyzes the content of events based on an operation of the user of the external terminals 20A and 20B. In other words, the event analysis unit 112 analyzes the content of the operations intended by the user operating the external terminals 20A and 20B. Furthermore, the event analysis unit 112 also determines whether the operation of the user that operates the external terminals 20A and 20B is a predetermined operation.

The application execution unit 113 executes applications that run on the information processing device 10. The applications to be executed are described below. The transmission/reception control unit 114 controls the transmission and reception of information between the external terminals 20A and 20B via the communication IF 15. Specifically, the transmission/reception control unit 114 transmits the same screen as is displayed on the output unit 142 to the external terminals 20A and 20B via the network 30.

The screen generation unit 115 generates a screen to be displayed on the output unit 142 in response to execution by the application.

The event execution determination unit 116 determines whether or not to permit execution of an event based on a user operation in response to the result of selection by a user on the selection screen to be described later. The specific determination method is described below.

The display control unit 117 controls display of the screen generated by the screen generation unit 115 on the output unit 142. The display control unit 117 controls the display of a selection screen to at least one device selected from the information processing device 10 and the external terminals 20*a* and 20*b* in order to allow the user to select whether or not to allow execution of an event based on the operating results in response to the screen being displayed on the external unit 142 and the operating results of the user with regard to that screen. The screen being displayed on the output unit 142 is the screen that is displayed while the application is executed. In this case, the display control unit 117 selects the device to display the selection screen from among the information processing device 10 and the external terminals 20*a* and 20*b*, based on the screen displayed by the application and the content of the operation intended by the user, and controls the display of the selection screen on the selected device. The specific content is described below.

The notification information selection unit 118 selects notification information to be sent to the information processing device 10 and the external terminals 20*a* and 20*b*. Notification information is selected based on the operation results of each user on the screen currently displayed on the information processing device 10 and the external terminals 20*a* and 20*b*. Details of the notification information are described below using FIG. 11.

The non-transitory storage device 13 stores notification information 131 to be selected by the non-transitory storage device 13. Here, notification information 131 includes notification information about the need for permission, awaiting approval, rejection, and operation required.

The user IF 14 has an input unit 141 and an output unit 142. The input unit 141 is used by the user to provide input to the information processing device 10. The output unit 142 is an example of a first display unit, and displays screens and information to the user. In this embodiment, the input unit 141 and output unit 142 are touch panels that include these functions. However, this is not a limitation, and the input unit 141 may be a keyboard, mouse, touchpad, and the like. The output unit 142 may be a single-function display device, for example, a liquid crystal display without touch panel functionality.

The external terminals 20*a* and 20*b* are examples of terminal devices that share a screen with the information processing device 10. The external terminals 20*a* and 20*b* are also computer devices, similar to the information processing device 10, and include a processor, memory, and the like. The external terminals 20*a* and 20*b* are equipped with a second display unit that can display the same screen as the screen transferred from the information processing device 10 and displayed on the output unit 142. The second display unit is, for example, a touch panel. Furthermore, the external terminals 20*a* and 20*b* may have the same configuration as the information processing device 10 depicted in FIG. 1. The external terminals 20*a* and 20*b* are, for example, mobile terminal devices that are carried by users, specifically smartphones and tablets. Alternatively, a display device for the rear seat is possible. Although two external terminals 20A and 20B are shown here, any number of external terminals is possible.

The network 30 may use wireless communication, including, for example, cellular phone lines, Wi-Fi (Wireless Fidelity, registered trademark), Bluetooth (registered trademark), ZigBee (registered trademark), and UWB (Ultra-Wide Band). The network 30 may use wired communication such as wired LAN (Local Area Network) circuits, USB (Universal Serial Bus), optical communication lines, public telephone lines, and the like. Furthermore, the network 30 may be a combination of wireless and wired communication lines, or may use the Internet and the like in combination.

Explanation of Operation of the Information
Processing Device 10

Three embodiments of the operation of the information
processing device 10 are described below.

First Embodiment

In the first embodiment, the application execution unit
113 executes video playback software that plays multimedia
as an application. In this case, the screen generation unit 115
generates a multimedia playback screen. Furthermore, the
display control unit 117 displays the multimedia playback
screen on the output unit 142, and sends instructions to the
external terminals 20a and 20b to display the multimedia
playback screen transferred from the aforementioned infor-
mation processing unit 10.

FIG. 2 depicts a multimedia playback screen being dis-
played on the information processing device 10 and the
external terminals 20a, 20b.

Here, the screen of the information processing device 10
is displayed at the front seat of the vehicle. The screen of
external terminal 20a is displayed in the rear seat (right) and
the screen of external terminal 20b is displayed in the rear
seat (left). In this case, the user of the information processing
device 10 is, for example, a driver of a vehicle. Furthermore,
the user of the external terminals 20a and 20b is, for
example, a person viewing the multimedia playback screen
on their own smartphone in the back seat.

In this case, multimedia image information generated by
the information processing device 10 is transferred to the
external terminals 20a and 20b, and a common screen is
displayed on the information processing device 10 and the
external terminals 20a and 20b. Furthermore, the figure
depicts a case where the user of the external terminal 20a
touches a pause button Bt2 to pause, as an operation related
to the screen.

The event analysis unit 112 determines whether the opera-
tion of the user of the external terminal 20a is a predefined
operation, and if the operation is not a predefined operation,
the event based on the operation is considered invalid. The
process to be executed by triggering screen operations is
predefined in an application that realizes screen sharing on
the information processing device 10. In this case, it is
possible to limit the operation target to be analyzed.

In the example of FIG. 2, a previous song skip button Bt1,
pause button Bt2, and next song skip button Bt3 are pro-
vided, and events based on operations other than the corre-
sponding operations for these buttons, previous song skip,
pause, and next song skip, are disabled.

Figure 3:
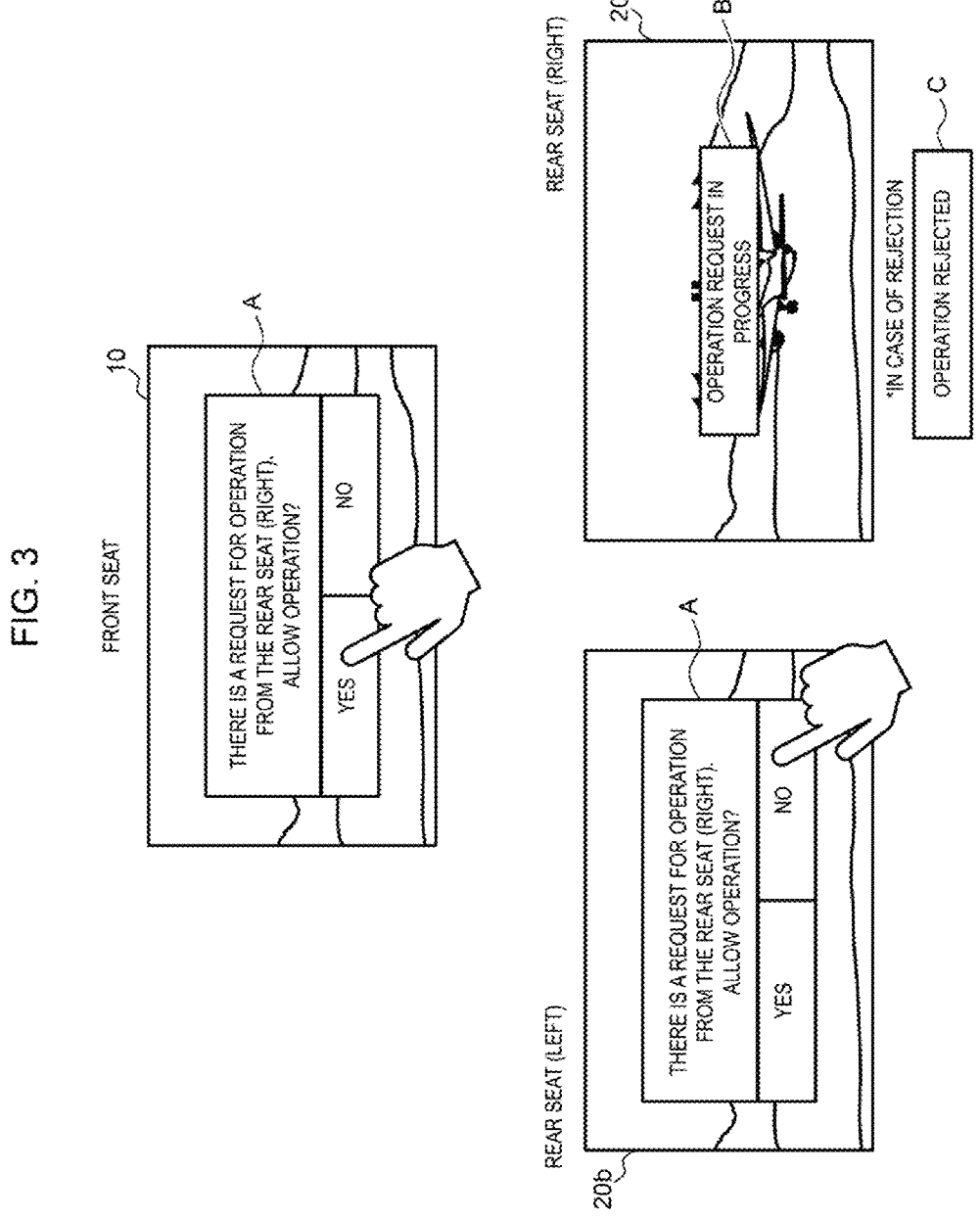
FIG. 3 depicts a screen displayed on each device when the user of an external terminal performs a pause operation.

FIG. 3 depicts a screen displayed on each device when the
user of an external terminal 20a performs a pause operation.
Note that the fact that the user of the external terminal 20a
performed the pause operation is the result of the analysis
obtained by the event analysis unit 112. Furthermore, based
on the analysis results of the event analysis unit 112, the
notification information selection unit 118 selects the noti-
fication information to be provided to the information pro-
cessing device 10 and external terminals 20a and 20b.

In this case, the display control unit 117 controls the
display of dialog A as a selection screen that allows the user
to select whether or not to allow execution of an event based
on the operation (in this case, pause) to external terminals
other than the information processing device 10 and the
external terminal where the operation was performed. Spe-
cifically, the display control unit 117 controls the display of
dialog A on the information processing device 10, sends a dialog display request (notification information 131) to the
external terminal 20b, and displays dialog A on the external
terminal 20b. Here, the display of dialog A is based on the
results of the selection made by the notification information
selection unit 118. FIG. 3 depicts a case where dialog A that
includes the message, "There is a request for operation from
the rear seat (right). Should the operation be allowed?" is
displayed on the information processing device 10 and the
external terminal 20b. The users of the information process-
ing device 10 and the external terminal 20b touches the
"Yes" button in the dialog A to grant permission, or the "No"
button to deny permission. The figure depicts that the user of
the information processing device 10 touched the "Yes"
button and the user of the external terminal 20b touched the
"No" button. Dialog A is deleted after a user touch operation.

Furthermore, while the user of the information processing
device 10 or the external terminal 20b selects to allow or
disallow the operation, the external terminal 20a on which
the operation is performed displays the dialog B with the
message "Operation Request in progress".

Possible conditions under which the event execution
determination unit 116 permits execution of an event based
on an operation include, for example, majority permission
by majority vote, permission for a specific seat (for example,
the driver's seat), and permission from an image distributor.
It is preferable to set a time limit to allow the user to choose
whether or not to allow events based on the operation to take
place. When this time limit is exceeded (timeout), the
information processing device 10 tallies the replies obtained
at that point.

The selection screen is displayed for the information
processing device 10 and external terminals 20a and 20b
that will be affected by executing an event based on the
operation. When the information processing device 10 is
sharing a multimedia playback screen with external termi-
nals 20a and 20b, for example, if the user of the external
terminal 20a performs a pause operation, this operation will
affect everyone viewing the multimedia playback screen.
Specifically, the screen will suddenly switch or a pop-up will
appear. Therefore, a selection screen is displayed to allow
the device of a user other than the user who performed the
operation to select whether or not to allow the execution of
that event (in this case, a pause) based on this operation. This
provides users other than the user who performed the
operation the authority to disallow execution of an event
based on the operation, and also allows that user to antici-
pate in advance if the screen will switch or a pop-up will
appear after allowing execution of the event based on the
operation. In this case, the display control unit 117 controls
the information processing unit 10 and the external terminal
20b to display the dialog A, which is a selection screen that
allows the user to select whether or not to allow execution
of the event based on the operation, based on the screen
displayed by the video playback software and the operation
performed by the user (here, pause).

When the information processing device 10 permits
execution of an event based on an operation according to the
result of the selection made by each user to the selection
screen, the process is executed based on the permitted event.
In this case, an event based on the pause operation per-
formed by the user of the external terminal 20a is executed,
and the multimedia playback screen is paused. In contrast,
when disallowing execution of an event based on an opera-
tion, the event based on the disallowed operation is not
executed. In this case, the event based on the pause operation
performed by the user of the external terminal 20a is
rejected, and the multimedia playback screen on each device is not paused. The external terminal 20*a* displays dialog C that includes the message "The operation has been rejected". Dialog C is deleted after a predetermined amount of time has elapsed after being displayed.

Figure 4:
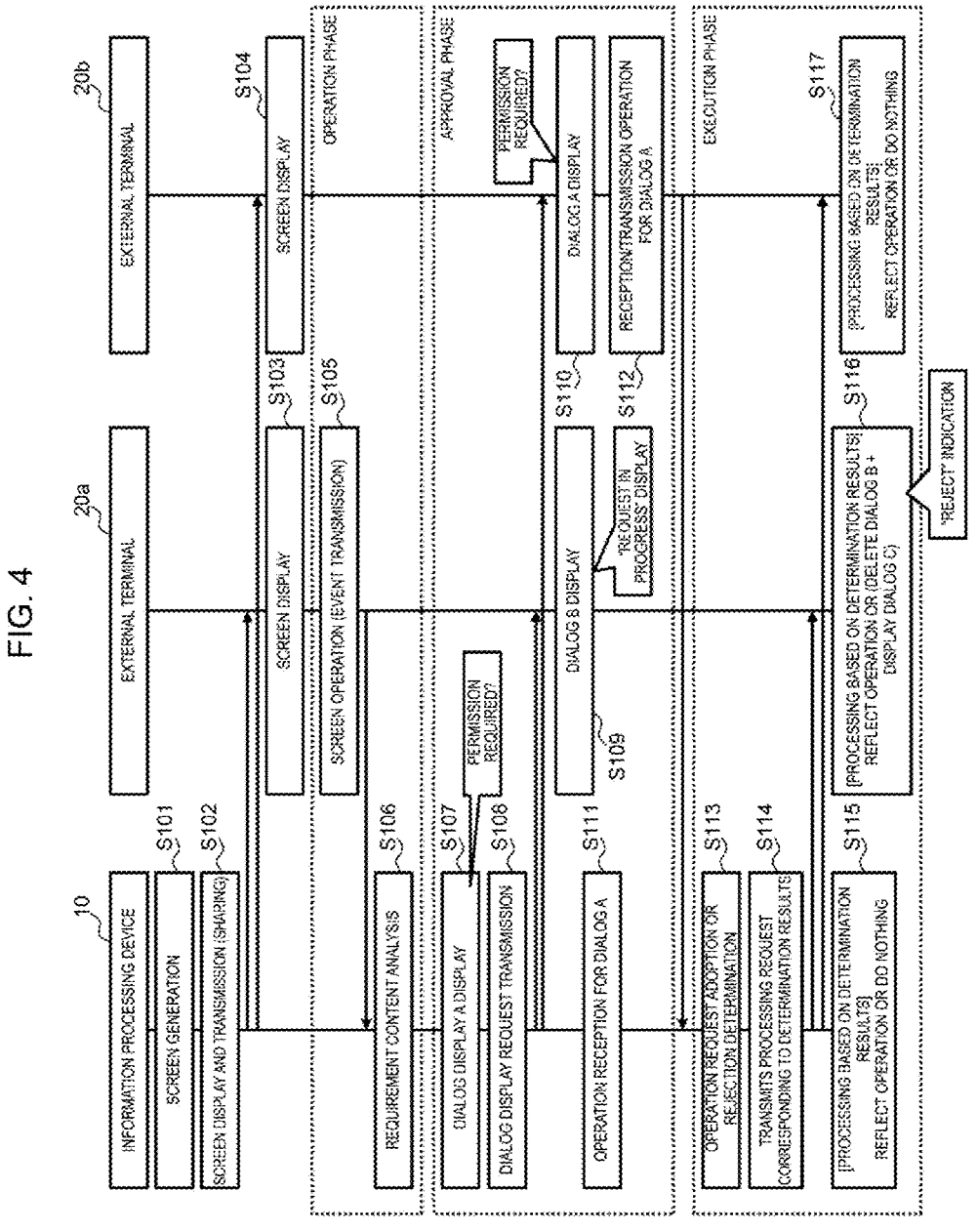
FIG. 4 is a sequence diagram depicting the process performed by each of the information processing device and the external terminal according to the first embodiment.

FIG. 4 is a sequence diagram depicting the process performed by each of the information processing device 10 and the external terminals 20*a*, 20*b* according to the first embodiment.

The information processing unit 10 generates a multimedia playback screen as a screen to be transferred for sharing with external terminals 20*a* and 20*b* (S101).

The information processing device 10 displays a multimedia playback screen on the information processing device 10 and transmits the image information of this screen to the external terminals 20*a* and 20*b* (S102).

The external terminals 20*a* and 20*b* receive the image information sent from the information processing device 10 and display the same multimedia playback screen as the information processing device 10 at each of the external terminals 20*a* and 20*b* (S103, S104).

When a user of the external terminal 20*a* performs a screen operation by touching the screen while the multimedia playback screen is being displayed, an event based on the operation is sent to the information processing device 10 (S105).

The information processing device 10 analyzes the content of the event based on the operation of the user of the external terminal 20*a* (S106).

Steps S105 and S106 are the operation phase that accepts screen operations from the user of the external terminal 20*a*.

If the operation is a predetermined operation, the information processing device 10 displays dialog A as a selection screen that allows the information processing device 10 to select whether or not to allow execution of the event, based on the operation by the user of the external terminal 20*a* (S107).

Meanwhile, the information processing device 10 sends a dialog display request (notification information 131) to the external terminals 20*a* and 20*b* (S108). This can be accomplished by the information processing device 10 sending a dialog display request (notification information 131) to the external terminals 20*a* and 20*b*. As a result, external terminal 20*a* displays dialog B containing the message, "Operation Request in progress" (S109). Furthermore, the external terminal 20*b* displays a dialog A similar to that of the information processing device 10 (S110).

The information processing device 10 accepts operations on dialog A from the user of the information processing device 10 (S111). Furthermore, the information processing device 10 accepts operations on dialog A from the user of the external terminal 20*b* (S112). In other words, the information processing device 10 accepts the result of each user's selection of "Yes" or "No" in the selection in dialog A.

Steps S107 to S112 are the approval phase that approves screen operations from the user of the external terminal 20*a*.

The information processing device 10 tallies the operation reception and determines whether the event based on the operation from the user of the external terminal 20*a* can be executed or not (S113).

The information processing device 10 sends a processing request corresponding to the result of the determination of S113 (S114).

As a result, the information processing device 10 performs processing corresponding to the determination results (S115). In this case, the process either reflects an event based on an operation or does nothing.

The external terminal 20*a* also performs processing corresponding to the determination result based on instructions from the information processing device 10 (S116). In this case, the process either deletes dialog B and displays a screen on the information processing device 10 reflecting the event based on the operation, or deletes dialog B and displays dialog C with a message, "The operation has been rejected". This is the result of a request for an operation performed by the user of external terminal 20*a*. Dialog C is deleted after a predetermined amount of time has elapsed after being displayed.

The external terminal 20*a* also performs processing corresponding to the determination results based on instructions from the information processing device 10 (S117). In other words, the external terminal 20*b* shares the screen displayed on the information processing device 10 in S115. Specifically, the external terminal 20*b* displays the screen displayed on the information processing device 10 reflecting the event based on the operation of the user of the external terminal 20*a*, or the screen that was displayed on the information processing device 10 before the operation of the user of the external terminal 20*a*.

S113 to S117 are in the execution phase in which screen operations from the user of the external terminal 20*a* are performed.

Second Embodiment

The second embodiment describes a case in which the application execution unit 113 executes navigation software as an application. In this case, the screen generation unit 115 generates a map screen. Furthermore, the display control unit 117 displays the map screen on the output unit 142, and sends instructions to the external terminals 20*a* and 20*b* to display the map screen transferred from the aforementioned information processing unit 10.

Figure 5:
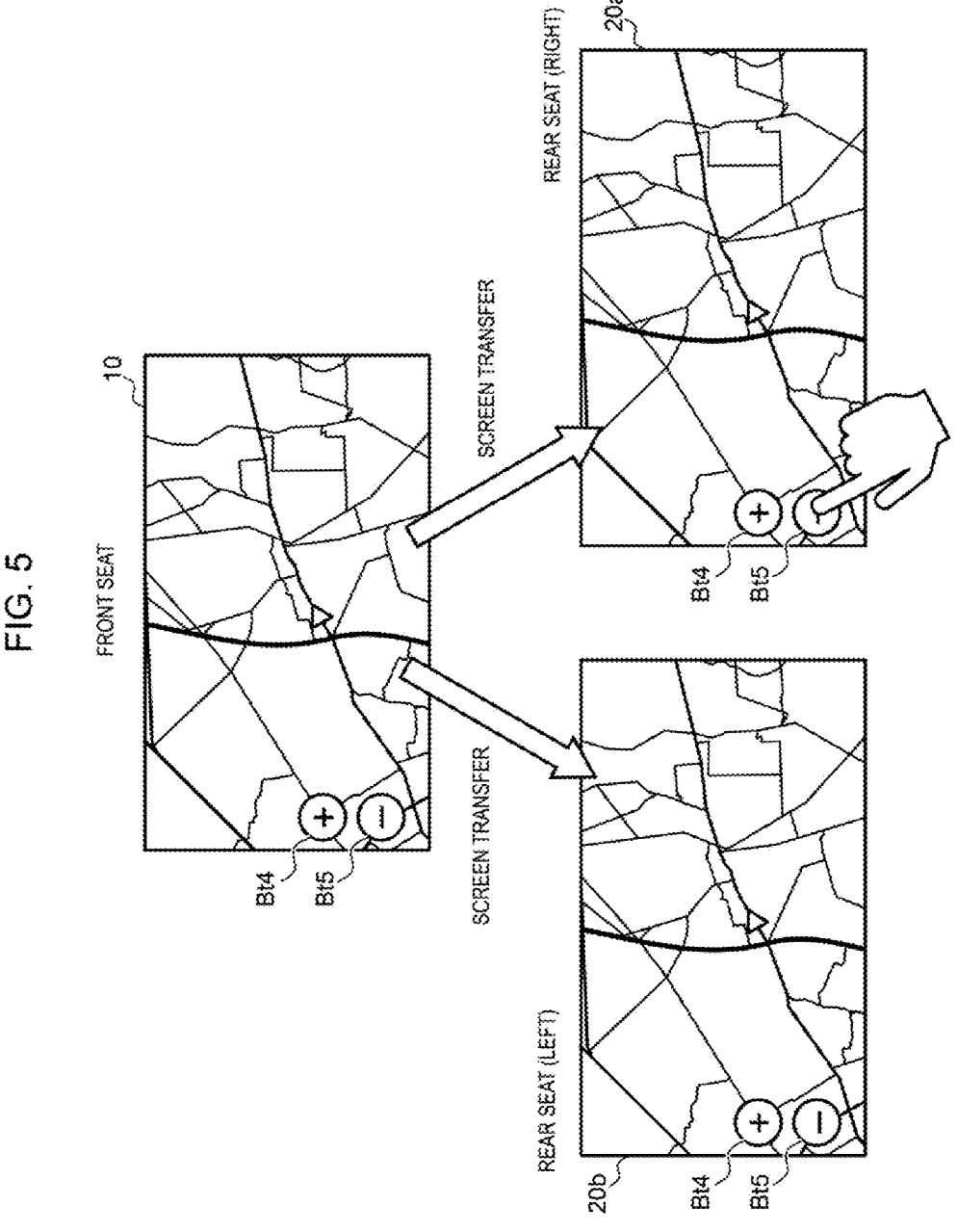
FIG. 5 depicts a map screen being displayed on the information processing device and the external terminal.

FIG. 5 depicts a map screen being displayed on the information processing device 10 and the external terminals 20*a*, 20*b*.

In this case, the image information of the map screen generated by the information processing device 10 is transferred to the external terminals 20*a* and 20*b*, and a common map screen is displayed on the information processing device 10 and the external terminals 20*a* and 20*b*. Furthermore, as an operation related to the screen by the user of the external terminal 20*a*, the case is shown in which the user touches the zoom-out button Bt5 to zoom out on the map screen.

In the example in FIG. 5, the zoom-in button Bt4 and zoom-out button Bt5 are provided, and events based on operations other than zoom-in and zoom-out, which are operations corresponding to these buttons, are disabled.

FIG. 6 depicts a screen displayed on each device when a user of an external terminal 20*a* performs a map screen zoom-out operation.

The display control unit 117 controls the display of dialog A as a selection screen that allows the information processing device 10 to select whether or not to allow execution of an operation-based event (in this case, zoom-out on the map). On the other hand, the display control unit 117 does not control the display of the selection screen to the external terminals 20*a* and 20*b*, and dialog A is not displayed on the external terminals 20*a* and 20*b*. FIG. 6 depicts a case where dialog A that includes the message, "There is a request for operation from the rear seat (right). Should the operation be allowed?" is displayed on the information processing device 10.

While the user of the information processing device 10 selects to allow or disallow the operation, the external terminal 20a displays the dialog B with the message, "Operation Request in progress". The external terminal 20a displays dialog B as a result of the dialog display request (notification information 131) sent by the display control unit 117 to the external terminal 20a based on the selection result of the notification information selection unit 118. Note that no dialog is displayed on the external terminal 20b.

When the map screen is displayed as a shared screen, if, for example, the operation to zoom-out of the map is performed by the user of the external terminal 20a, an event based on this operation will mainly affect the driver who is driving in the front seat. In other words, if unintended operations are performed on the map screen displayed by the information processing unit 10 while driving, driving may be affected. On the other hand, the impact on the user of external terminal 20b is small. Therefore, the display control unit 117 controls the display of a selection screen that allows the information processing device 10 to select whether or not to allow execution of an operation-based event (in this case, zoom-out of the map). On the other hand, the display control unit 117 does not control the display of the selection screen on the external terminal 20b. In other words, dialog A is not displayed on the external terminal 20b. In this case, the display control unit 117 controls the information processing unit 10 and the external terminal to display the dialog A, which is a selection screen that allows the user to select whether or not to allow execution of the event based on the operation, in response to the screen displayed by the navigation software and the operation performed by the user (here, map zoom-out).

When the information processing device 10 permits execution of an event based on an operation according to the result of the selection made by the user of the information processing device 10 to the selection screen, the process is executed based on the permitted event. In this case, an event based on a map zoom-out operation performed by the user of the external terminal 20a is executed and the map is zoomed out. On the other hand, when disallowing an event based on an operation, the event based on the disallowed operation is not executed. In this case, the event based on the operation to zoom-out of the map performed by the user of the external terminal 20A is rejected, and the map screen is not zoomed out. In this case, the external terminal 20a displays dialog C that includes the message, "The operation has been rejected". Dialog C is deleted after a predetermined amount of time has elapsed after being displayed.

Figure 7:
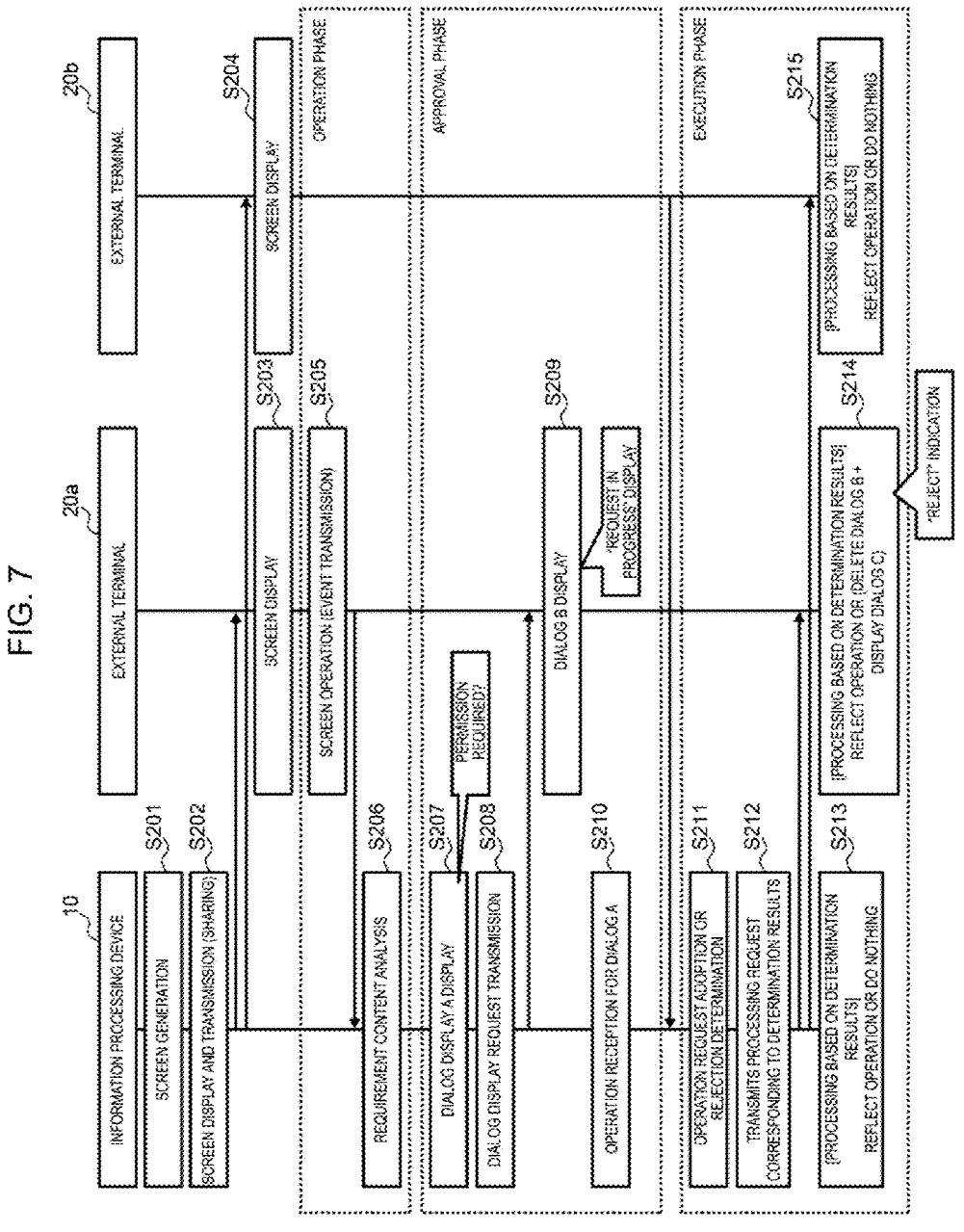
FIG. 7 is a sequence diagram depicting the process performed by each of the information processing device and the external terminal according to the second embodiment.

FIG. 7 is a sequence diagram depicting the process performed by each of the information processing device 10 and the external terminals 20a, 20b according to the second embodiment.

S201 to S207 in FIG. 7 are similar to S101 to S107 in FIG. 4. However, the operation by the user of external terminal 20a is changed from a pause operation to zooming out of the map screen.

After S208 in FIG. 7, the process is as follows.

The information processing device 10 sends a dialog display request (notification information 131) to the external terminals 20a (S208). As a result, external terminal 20a displays dialog B containing the message, "Operation Request in progress" (S209). Unlike the case in FIG. 4, the dialog display request (notification information 131) is made only to the external terminal 20a, and no dialog is displayed on the external terminal 20b. The information processing device 10 accepts operations on dialog A from the user of the information processing device 10 (S210). Unlike the case in FIG. 4, the dialog is not displayed on the external terminal 20b, so the information processing device 10 does not accept operations from the user of the external terminal 20b for dialog A. S211 to S215 in FIG. 7 are similar to S113 to S117 in FIG. 4.

In the second embodiment, Steps S205 and S206 are the operation phase that accepts screen operations from the user of the external terminal 20a. Steps S207 to S210 are the approval phase that approves screen operations from the user of the external terminal 20a. S211 to S215 are in the execution phase in which screen operations from the user of the external terminal 20a are performed.

Third Embodiment

The third embodiment describes a case in which the application execution unit 113 executes browsing software of a browser or the like as an application. In this case, the screen generation unit 115 generates a display screen of a web page. The display control unit 117 displays the web page display screen on the output unit 142, and sends instructions to the external terminals 20a and 20b to display the web page display screen transferred from the aforementioned information processing unit 10.

Figure 8:
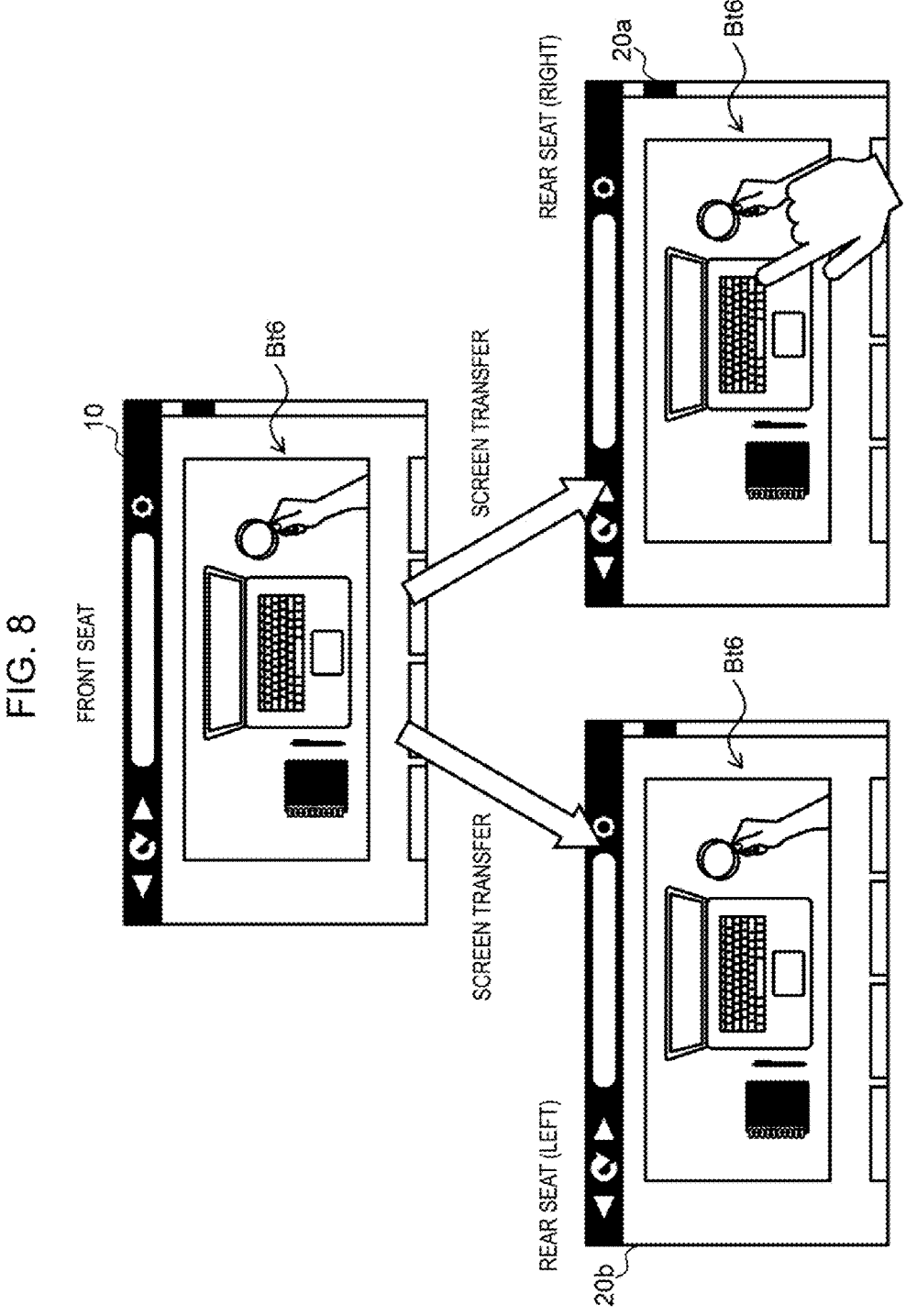
FIG. 8 depicts a web page screen being displayed on the information processing device and the external terminal.

FIG. 8 depicts a web page screen being displayed on the information processing device 10 and the external terminals 20a, 20b.

In this case, the image information of the web page display screen generated by the information processing device 10 is transferred to the external terminals 20a and 20b, and a common web page display screen is displayed on the information processing device 10 and the external terminals 20a and 20b. The figure depicts a case where the user of the external terminal 20a touches a link button Bt6 to transition to another web page, as an operation related to the screen. In this case, the event based on the aforementioned operation is a screen transition to a link destination.

In the example in FIG. 8, the link button Bt6 is provided, and events based on operations other than transitioning to another web page, which is the corresponding operation, are disabled.

Figure 9:
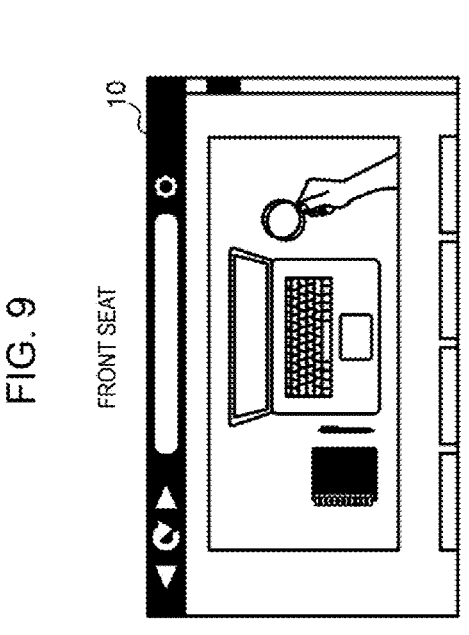
FIG. 9 depicts a screen displayed on each device when a user of an external terminal performs an operation of displaying a linked screen.
Figure 9:
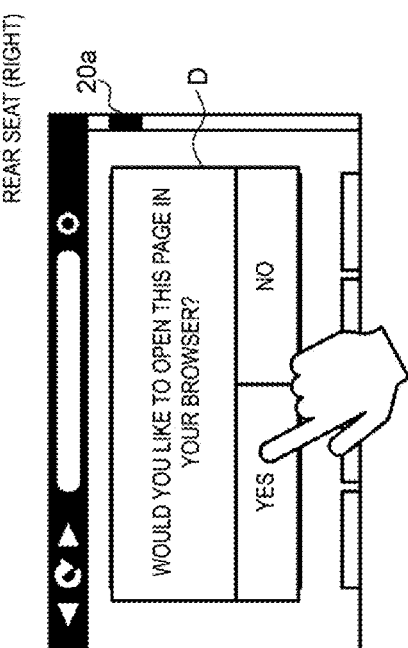
Figure 9:
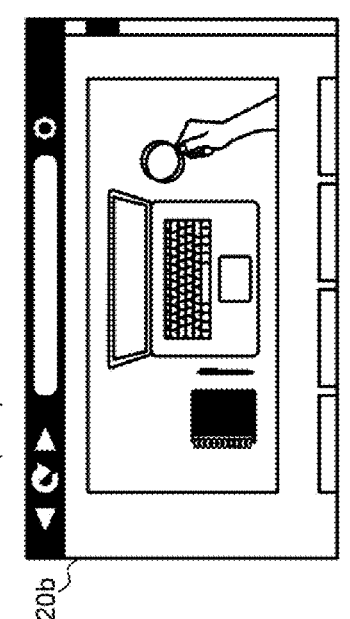

FIG. 9 depicts a screen displayed on each device when a user of an external terminal 20a performs an operation of displaying a linked screen.

The display control unit 117 controls the display of the dialog D as a selection screen that allows the external terminal 20a on which the operation was performed to select whether or not to allow execution of the event based on the operation. On the other hand, the display control unit 117 does not control the display of the selection screen to other devices. In other words, no dialog is displayed on any device other than the external terminal 20a that performed the operation. FIG. 9 depicts a case in which a dialog D is displayed to external terminal 20a containing the message, "Would you like to open this page in a browser?"

When the display screen of a web page is displayed as a shared screen, if an operation is performed to transition to another web page, only the user of the external terminal 20a is affected by the event based on this operation. On the other hand, conventional web pages are displayed on the information processing device 10 and external terminal 20b, so there is no impact on these users. Therefore, the display control unit 117 controls the display of a selection screen that allows the external terminal 20a to select whether or not to allow execution of the event based on this operation. On the other hand, the display control unit 117 does not control the display of the selection screen on devices other than the external terminal 20a. In other words, the dialog D is not displayed on any other device other than the external terminal 20a. In this case, the display control unit 117 controls the information processing unit and the external terminal to display the dialog D, which is a selection screen that allows the user to select whether or not to allow execution of the event based on the operation, based on the screen displayed by the browser software and the operation performed by the user (here, transition screen to link destination).

When the event based on the operation is allowed by the user of external terminal 20a, in other words, when the "Yes" button in dialog D is selected, screen sharing between the external terminal 20a and the information processing device 10 is released, and the linked screen is displayed by the viewing software provided by the external terminal 20a where the operation was performed. In this case, the release of screen sharing means that the information processing device 10 stops transferring (sending) the shared screen to the external terminal 20a. In this manner, the screen being shared is not controlled by the external terminal 20a that performed the screen operation, and the information processing equipment 10 and external terminal 20b can maintain the screen before the operation by the user of the external terminal 20a. The external terminal 20a can also transition to other web pages per the operation by the user. In other words, the convenience of each device is improved.

Figure 10:
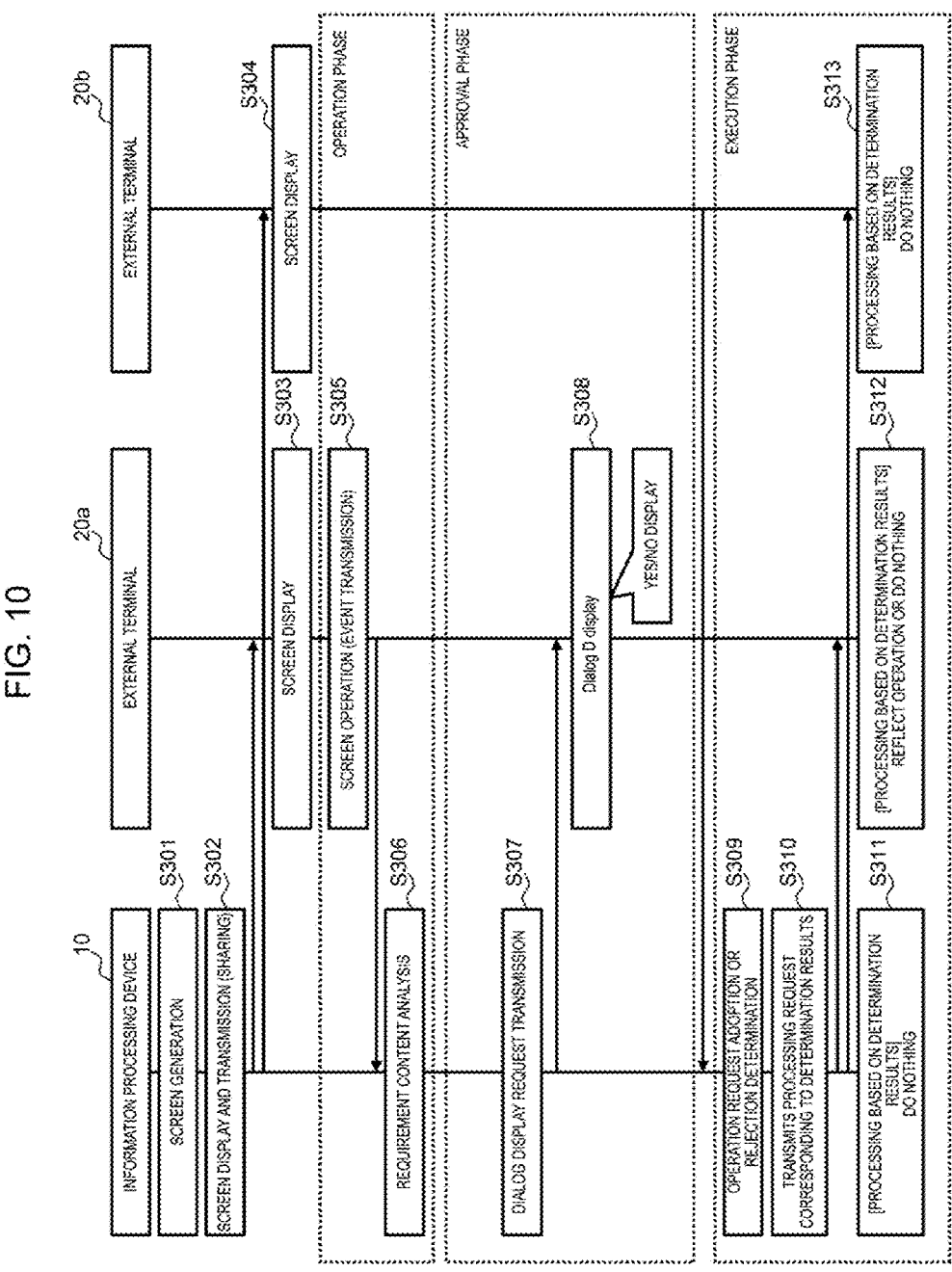
FIG. 10 is a sequence diagram depicting the process performed by each of the information processing device and the external terminal according to the third embodiment.

FIG. 10 is a sequence diagram depicting the process performed by each of the information processing device 10 and the external terminals 20a, 20b according to the third embodiment.

S301 to S306 in FIG. 10 are similar to S201 to S206 in FIG. 7. However, the operation by the user of external terminal 20a is changed from a map screen zoom-out operation to manipulating the display of the linked screen.

After S307 in FIG. 10, the process is as follows.

The information processing device 10 sends a dialog display request (notification information 131) to the external terminals 20a (S307). As a result, the external terminal 20a displays a dialog D containing the message "Would you like to open this page in your browser?" (S308).

The information processing device 10 accepts operations on dialog D from the user of the external terminal 20a (S309). In other words, the information processor 10 accepts "Yes" or "No" operations to be selected in the dialog D.

S310 to S311 in FIG. 10 are similar to S211 to S212 in FIG. 7.

In subsequent S312, the information processing device 10 performs processing corresponding to the determination result, but in this case, it does nothing (S312).

The external terminal 20a performs processing corresponding to the determination result based on instructions from the information processing device 10 (S313). In this case, this process will either display the linked screen in the browser provided by the external terminal 20a or do nothing.

The external terminal 20a performs processing corresponding to the determination results based on instructions from the information processing device 10 (S314).

In the third embodiment, steps S305 and S306 are the operation phase that accepts screen operations from the user of the external terminal 20a. Steps S307 to S309 are the approval phase that approves screen operations from the user of the external terminal 20a. S310 to S314 are in the execution phase in which screen operations from the user of the external terminal 20a are performed.

Description of Notification Information 131

FIG. 11 depicts notification information 131.

Notification information 131 is a processing request or notification content sent by the display control unit 117 to the information processing device 10 and the external terminals 20a and 20b based on the selection result of the notification information selection unit 118. Here, the notification information 131 indicated by ID 1 to 5 is depicted. Of these, ID 1 through 4 correspond to the permission required, approval pending, rejection, and operation required depicted in FIG. 1. In addition, the notification information for ID 1 to 4 represents the information in dialogs A to D depicted in FIGS. 4 to 10. Notification content is not limited to this case, and for example, the specific content of the event based on the operation of the may be displayed in the dialog, for example, "There is a request for operation (pause) from the rear seat (right). Do you want to allow the operation?"

The aforementioned embodiment can provide an information processing device 10 and an image control system 1 that can maintain convenience for other devices even when a request is made by one screen sharing destination device. The result is a secure, easy-to-use screen-sharing feature.

Description of Information Processing Method

The process performed by the information processing device 10 of the present embodiment is an information processing method performed by an information processing device 10, containing a first display unit, a screen generation unit 115 for generating a screen to be displayed on the first display unit which is an output unit 142, and a transmission/reception control unit 114 for transmitting the screen to an external terminal 20a, 20b via a network 30, including the steps of:

detecting a user operation performed on the screen displayed on the second display unit of the external terminals 20a, 20b;

controlling display to at least one device of the information processing device 10 and the external terminals 20a, 20b of a selection screen that allows a user to select whether or not to allow execution of an event based on the operation in response to the screen and the operation; and determining whether or not to permit execution of an event based on the operation according to the selection result of the user on the selection screen.

Description of Program

The processing performed by the information processing equipment 10 in this embodiment is prepared as a program, such as application software, for example. This process is achieved by software and hardware resources working together. That is, the processor 11 inside the computer in the information processing device 10 executes programs that achieve each of the aforementioned functions and causes each of these functions to be achieved.

In the present embodiment, the processing performed by the information processing device 10 is a program executed by a computer of the information processing device 10, which is equipped with a first display unit, a screen generation unit 115 that generates a screen to be displayed on the output unit 142, the first display unit, and a transmission/reception control unit 114 that transmits the screen to external terminals 20a and 20b via the network 30. The program causes the information processing equipment 10 and the external terminals 20a and 20b to achieve a function for detecting user operation performed on a screen displayed on a second display provided by the external terminals 20a and 20b, a function for controlling the display of a selection screen that allows the user to select whether or not to allow execution of an event based on the operation in response to the screen and the operation, and a function for determining whether or not to allow execution of an event based on the operation based on the result of the user's selection on the selection screen.

The program to achieve this embodiment can be provided by means of communication or by storing the program in a recording medium such as CD-ROM.

The technical scope of the invention is not limited to the scope described in the above embodiment. It is clear from the claims that various changes or improvements to the above embodiments are also included in the technical scope of the invention.

For example, in the above embodiment, the information processing device 10 was a screen sharing source, but in practice, the roles of screen sharing source and screen sharing destination are interchangeable. In other words, at a certain point in time, the external terminals 20a or 20b become the screen sharing source and the information processing device 10 becomes the screen sharing destination.

For example, the operation phase, approval phase, and execution phase are provided for the purpose of explaining the contents of the invention in an easy-to-understand manner, but the process might not be clearly divided into these three phases. This name is not limited to any particular name. For example, the approval phase may be called the inquiry phase.

DESCRIPTION OF REFERENCE NUMERALS

1 . . . Image control system, 10 . . . Information processing device, 11 . . . Processor, 12 . . . Memory, 20a, 20b . . . External terminal, 111 . . . Operation detection unit 112 . . . Event analyzer, 113 . . . Application executor, 114 . . . Transmission/reception control unit 115 . . . Screen generation unit, 116 . . . Event execution determination unit, 117 . . . Display control unit, 118 . . . Notification information selection unit, 142 . . . Output unit, A to D . . . Dialogs

What is claimed is:

1. An information processing device that shares screens with an external terminal device, comprising:
   a first display unit;
   a processor that:
      generates a screen to be displayed on the first display unit;
      transmits the screen to the terminal device via a network;
      detects a user operation performed on the screen displayed on a second display unit provided by the terminal device;
      controls displaying to at least one of the information processing device and the terminal device of a selection screen that allows a user to select whether or not to allow execution of an event based on the user operation in response to the screen and the user operation; and
      determines whether or not to permit execution of an event based on the user operation according to the selection result of the user on the selection screen.

2. The information processing device according to claim 1, wherein the screen is a multimedia playback screen; and wherein the processor controls the display of the selection screen to the terminal devices other than the information processing device and the terminal device on which the user operation was performed.

3. The information processing device according to claim 1, wherein the screen is a map screen; and
   wherein the processor controls the display of the selection screen to the information processing device and does not control the display of the selection screen to the terminal devices.

4. The information processing device according to claim 1, wherein the screen is a display screen of a web page; and
   wherein the processor controls the display of the selection screen to the terminal device that performed the user operation and does not control the display of the selection screen to other devices.

5. The information processing device according to claim 4, wherein the event based on the user operation is a screen transition to a link destination; and
   wherein, when the execution of an event based on the user operation is permitted, the processor stops transmitting the screen to and from the terminal device that performed the user operation and controls the display of the linked screen by viewing software provided by the terminal device where the user operation was performed.

6. An information processing method performed by a processor of an information processing device comprising a first display unit, a screen generation unit for generating a screen to be displayed on the first display unit, and a transmission/reception control unit for transmitting the screen to a terminal device via a network, the method comprising:
   detecting a user operation performed on a screen displayed on a second display unit of a terminal device;
   controlling display to at least one device of a information processing device and the terminal device of a selection screen that allows a user to select whether or not to allow execution of an event based on the user operation in response to the screen and the user operation; and
   determining whether or not to permit execution of an event based on the user operation according to the selection result of the user on the selection screen.

7. A non-transitory storage medium storing a program causing a processor to implement:
   generating a screen to be displayed on a first display unit of an information processing device;
   transmitting the screen to an external terminal device via a network;
   detecting a user operation performed on the screen displayed on a second display unit of the terminal device;
   controlling display to at least one device of the information processing device and the terminal device of a selection screen that allows a user to select whether or not to allow execution of an event based on the user operation in response to the screen and the user operation; and
   determining whether or not to permit execution of an event based on the user operation according to the selection result of the user on the selection screen.

* * * * *